United States Patent
Warren et al.

(10) Patent No.: US 8,022,571 B2
(45) Date of Patent: Sep. 20, 2011

(54) POWER MANAGEMENT CIRCUITRY AND SOLAR CELLS

(75) Inventors: Daniel A. Warren, San Jose, CA (US); Michael Rosenblatt, Campbell, CA (US)

(73) Assignee: Apple Inc., Cupertino, CA (US)

( * ) Notice: Subject to any disclaimer, the term of this patent is extended or adjusted under 35 U.S.C. 154(b) by 452 days.

(21) Appl. No.: 12/186,306

(22) Filed: Aug. 5, 2008

(65) Prior Publication Data
US 2010/0013309 A1    Jan. 21, 2010

Related U.S. Application Data

(60) Provisional application No. 61/081,959, filed on Jul. 18, 2008.

(51) Int. Cl.
*H02J 9/00* (2006.01)
*H02J 1/00* (2006.01)

(52) U.S. Cl. ............... 307/64; 307/71; 307/77; 320/101

(58) Field of Classification Search .................... 307/64, 307/71, 77; 320/101
See application file for complete search history.

(56) References Cited

U.S. PATENT DOCUMENTS

| | | | |
|---|---|---|---|
| 6,323,846 B1 | 11/2001 | Westerman et al. | |
| 6,339,311 B1 * | 1/2002 | Caldwell | 320/101 |
| 6,350,944 B1 * | 2/2002 | Sherif et al. | 136/244 |
| 6,624,535 B2 * | 9/2003 | Morrow | 307/71 |
| 7,514,900 B2 * | 4/2009 | Sander et al. | 320/101 |
| 2007/0152983 A1 | 7/2007 | McKillop et al. | |
| 2008/0084117 A1 | 4/2008 | Sander et al. | |
| 2008/0084177 A1 | 4/2008 | Sander et al. | |
| 2008/0094025 A1 | 4/2008 | Rosenblatt et al. | |

* cited by examiner

*Primary Examiner* — Jared J Fureman
*Assistant Examiner* — Hal I Kaplan
(74) *Attorney, Agent, or Firm* — Kramer Levin Naftalis & Frankel LLP

(57) ABSTRACT

This is directed to methods, systems, and apparatuses for implementing circuitry that can be used to control multiple solar cells to generate power for a portable electronic device. For example, in response to determining that one or more of the solar cells is generating a reduce voltage output (e.g., due to a partial obstruction of one or more of the solar cells), the connections among the solar cells can be configured to generate a constant preset voltage, as long as a subset of the solar cells is operating. The voltage generated by the solar cells can then be boosted to a value suitable for powering the portable electronic device and/or any of its individual components. As another example, the connections among the solar cells can be configured to generate a startup voltage to directly power the portable electronic device and/or any of its components.

25 Claims, 6 Drawing Sheets

POWER MANAGEMENT CIRCUITRY AND SOLAR CELLS

CROSS-REFERENCE TO RELATED APPLICATIONS

This application claims priority to Rosenblatt et al., U.S. Provisional Patent Application No. 61/081,959, filed Jul. 18, 2008, entitled "Power Management Circuitry and Solar Cells," the entirety of which is incorporated herein by reference.

FIELD OF THE INVENTION

This can relate to systems, methods, computer readable media, and other means for using solar cells that are capable of reliably powering a portable electronic device.

BACKGROUND OF THE DISCLOSURE

Portable electronic devices, such as cellular telephones, media players (e.g., music, video and/or audio players), and hybrid devices that combine telephone and media playing functionality are known. These devices are sometimes powered by rechargeable batteries such as nickel-cadmium, lithium-ion, nickel-metal hydride, and rechargeable alkaline batteries.

The batteries of such devices are often recharged using standard recharging means and methods. For example, the battery of a device can be recharged by plugging a charger into the device and into a conventional alternating current (AC) outlet. As another example, the battery of a device can be charged by plugging the device into another electronic device using a universal serial bus (USB) connection (such as a USB cable or docking station). However, it may be inconvenient for the user to charge the batteries when, for example, the user is on the road. In addition, a typical recharge will power the battery for only a limited amount of run time (e.g., 10 to 24 hours). After the battery has been drained, the user must recharge or replace the battery to continue using the portable electronic device.

Some portable electronic devices (e.g., calculators) may use solar cells to power the device. Because of the small size of these portable electronic devices, however, the number of solar cells that can be placed on the device is limited. Consequently, while the voltage generated by the solar cells may be enough to power less energy demanding devices, the voltage may be insufficient for portable electronic devices that demand more power.

Furthermore, as an increasing number of advanced features are packed into these portable electronic devices, larger power sources (e.g., larger batteries and more solar cells) are required to power the devices. Thus, there are competing interests between the portability of these devices and the amount of available power.

SUMMARY OF THE DISCLOSURE

This invention can relate to methods, systems, and apparatuses for powering a portable electronic device using one or more solar cells. The portable electronic device may be an iPod™ or iPhone™ (available from Apple Inc. of Cupertino, Calif.), or any other suitable media device. The solar cells can generate electrical power in response to being exposed to light energy.

In some cases, the amount of voltage and/or current generated by the solar cells may not be enough to power the portable electronic device. Thus, in some embodiments, boost circuitry powered by a battery and/or the solar cells can regulate the power generated by the solar cells. The boosted power can then be used to power other components of the portable electronic device.

In addition, the portable electronic device can include circuitry (e.g., bootstrap circuitry) which can monitor the state of the battery. If the battery is not drained (e.g., battery is generating energy above a predetermined minimum threshold), the circuitry can connect the solar cells in a series/parallel configuration, which can allow the solar cells to generate a constant preset voltage as long as a subset of the solar cells is operating. This configuration may thus provide protection by allowing the solar cells to continue powering the portable electronic device even if the solar cells are partially obstructed. In the series/parallel configuration, a subset of the solar cells (e.g., pairs of solar cells) can be connected in a parallel configuration to form parallel groups. Each of the parallel groups can then be connected in series.

In the event that the battery is drained (e.g., battery is generating energy below a predetermined minimum threshold), the boost circuitry can not be powered by the battery. In such circumstances, the invention can connect the solar cells in a series configuration that facilitates the generation of a startup voltage sufficient to power the portable electronic device. The startup voltage can be configured to be higher than the voltage generated by the solar cells in the series/parallel configuration. In some cases, the solar cells can also be used to directly power the boost circuitry when the solar cells are connected in the series configuration. As a result, the boost circuitry can continue to regulate the power generated by the solar cells even when the battery is drained.

In some embodiments, while the solar cells are connected in the series configuration, surplus energy (e.g., generated energy that exceeds the load of the portable electronic device) can be used to charge the battery if the battery is not fully charged (e.g., the battery is generating energy at or below an operating threshold, which can be higher than or the same as the predetermined minimum threshold). The circuitry can detect when the battery has been charged to a value suitable for powering the boost circuitry (e.g., a value that exceeds the operating threshold). Once the battery is charged to a suitable value, the circuitry can connect the solar cells in the series/parallel configuration to provide protection from the partial obstruction of the solar cells.

In order to automatically reconfigure the solar cells in different configurations (e.g., series and series/parallel configurations), switches can be placed between the solar cells, a power plane (e.g., $V_{OUT}$), and/or a ground plane. The individual switches can then be opened and/or closed, thereby connecting the solar cells in either the series/parallel or series configuration. In some embodiments, the switches can be selected such that their normal operating states (e.g., inactive states that require no input power) can automatically connect the solar cells in the series configuration (e.g., in the event that the circuitry is not operating because of the drained battery).

In some embodiments, the circuitry can actively detect partial obstructions and can automatically reconfigure the flow of electricity generated by the solar cells around the partial obstructions. Thus, using a matrix of switches, a subset of the solar cells that are not obstructed can be configured to generate a constant preset voltage for powering the portable electronic device.

Therefore, in accordance with the invention, there is provided methods, systems, and apparatuses for powering a portable electronic device using one or more solar cells. The connections among the solar cells can be configured such that a constant preset voltage is generated as long as a subset of the solar cells is operating. In addition, the solar cells can be configured to generate a startup voltage and/or directly power the portable electronic device without the need for additional components (e.g., the need for a battery and/or boost circuitry).

Methods, systems, and apparatuses for powering a portable electronic device using solar cells are discussed in greater detail below.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE DISCLOSURE

Conventional portable electronic devices can be powered by standard batteries. Although these batteries can be rechargeable, oftentimes the user may not have time to recharge the batteries or may have problems finding a suitable charging location. Furthermore, the user typically needs to carry around one or more other devices such as a charger, a USB cable, a docking station, and/or another electronic device. Finally, even after the batteries have been recharged, the batteries can only last for a limited amount of time before another recharge is needed.

Some portable electronic devices (e.g., calculators) use solar cells to power the device. However, because only a small number of solar cells can be placed on the device and because the current output of each solar cells is relatively low, the power generated by these solar cells is limited. This in turn limits the functionality provided by solar powered devices and has led to much research and development in battery technology.

Some embodiments of the invention focus on circuitry for controlling multiple solar cells that can power more complicated portable electronic devices (such as media players and/or cellular telephones). The solar cells can generate voltage in response to being exposed to light energy. Because the amount of voltage generated by the solar cells may not be enough to power some features of an advanced portable electronic device, some embodiments of the invention can include battery-powered boost circuitry. The boost circuitry can boost the voltage before the voltage is provided to one or more components of the portable electronic device.

In the event that a battery for powering the boost circuitry is drained, bootstrap circuitry can connect the solar cells in a configuration such that a constant preset voltage can be generated as long as a subset of the solar cells is operating. Furthermore, in the event that the battery is drained, the solar cells can be automatically connected in a different configuration such that the solar cells can generate a higher startup voltage.

Figure 1A:
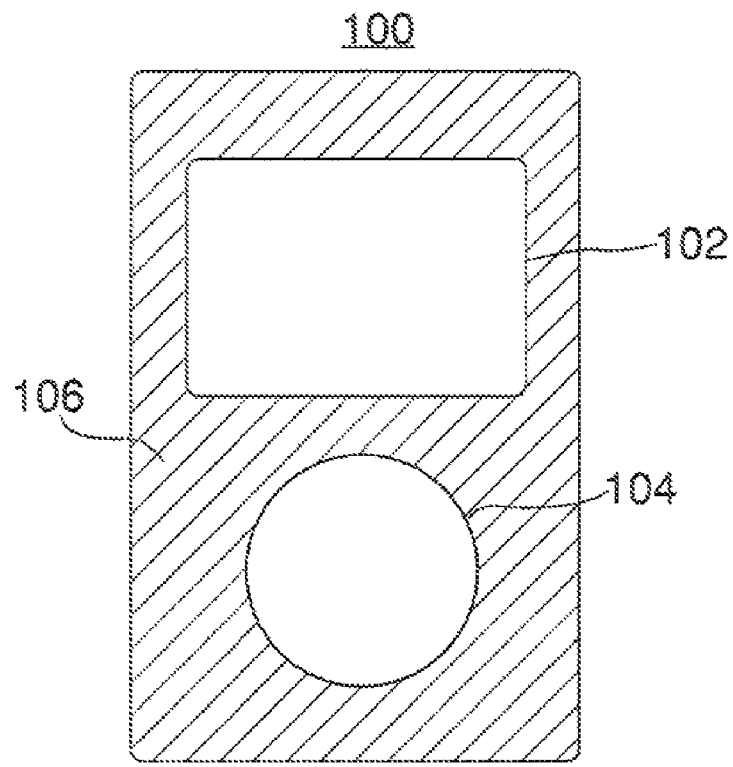
FIGS. 1A and 1B show simplified diagrams of a portable electronic device constructed in accordance with some embodiments of the invention.
Figure 1B:
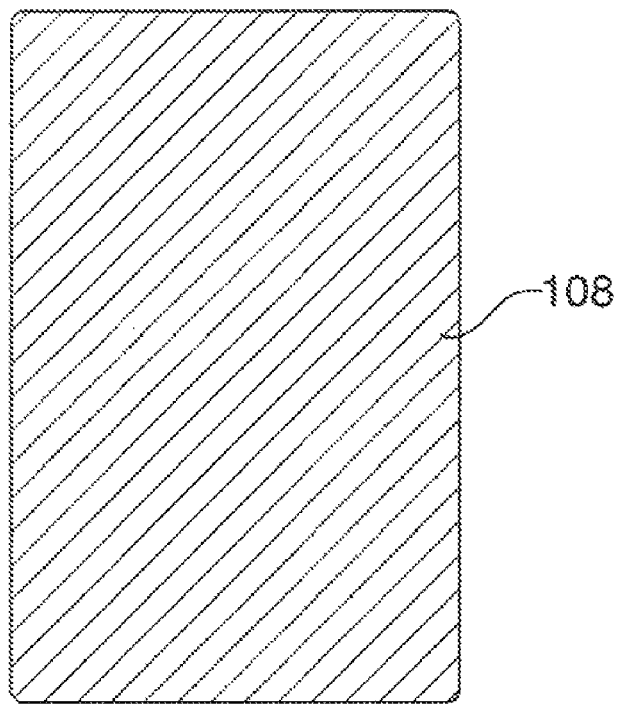

FIGS. 1A and 1B show simplified diagrams of an exemplary portable electronic device 100 constructed in accordance with some embodiments of the invention. In some embodiments, portable electronic device 100 can be an iPod™ available from Apple Inc., of Cupertino, Calif.

Portable electronic device 100 can include display component 102 and user input component 104. However, other displays and user input components can also be utilized without departing from the spirit of the invention.

Display component 102 is shown in FIG. 1A as a display screen that may be integrated into portable electronic device 100. Display component 102 does not have to be integrated into portable electronic device 100 and may instead be external to portable electronic device 100. For example, display component 102 may be a computer monitor, television screen, and/or any other graphical user interface, textual user interface, or combination thereof. Display component 102 may enable portable electronic device 100 to playback the video portion of media, and/or may serve as part of the user interface, displaying command menus, or serve any other suitable display functions.

User input component 104 is illustrated in FIG. 1A as a click wheel. Persons skilled in the art will appreciate that user input component 104 can also be any other type of user input component or device, such as, for example, a mouse, keyboard, trackball, slider bar, one or more buttons, portable electronic device pad, dial, or any combination thereof. User input component 104 can also include a multi-touch screen such as that described in Westerman et al., U.S. Pat. No. 6,323,846, issued Nov. 27, 2001, entitled "Method and Apparatus for Integrating Manual Input," which is incorporated by reference herein in its entirety. User input component 104 can emulate a rotary phone or a multi-button portable electronic device pad, which can be implemented on a touch screen. User input component 104 can also include the combination of a click wheel, a screen, and/or another user input device. A more detailed discussion of such a rotary phone interface may be found, for example, in McKillop et al., U.S. published patent application No. 2007/0152983, filed Nov. 1, 2006, entitled "Touch Pad with Symbols based on Mode," which is incorporated by reference herein in its entirety.

As shown in FIGS. 1A and 1B, for example, solar cells 106 and 108 can be placed on the front and back sides of portable electronic device 100, respectively. Each solar cell, as the phrase is used herein, can be an integrated component, external device, or any part of a component of device 100, which is capable of converting light energy into electric energy. Any suitable material can be used to produce a solar cell, including rigid materials (e.g., crystalline silicon wafers and amorphous silicon films), non-rigid materials (e.g., Nanosolar Solar-Ply™ available from Nanosolar of Palo Alto, Calif.), and/or any other material that converts light into electricity. Solar cells are discussed in more detail in Rosenblatt et al., U.S. published patent application No. 2008/0094025, filed Oct. 26, 2006, entitled "Solar Cells on Portable Devices," which is incorporated by reference herein in its entirety.

As shown in FIG. 1A, because solar cells 106 can be embedded in the entire front cover of the device (including where display component 102 and user input component 104 are located), at least a portion of the front cover can be made from a transparent or semi-transparent material. This can allow light to reach the solar cells so that the solar cells can generate electrical power. In addition, if the solar cells are placed behind or within display component 102 and user input component 104, the components can also be transparent or semi-transparent to allow light to reach the solar cells. Although solar cells 106 and 108 are shown in FIGS. 1A and 1B as being included on the entirety of both sides of portable electronic device 100, persons skilled in the art will appreciate that solar cells can be placed on only one side of portable electronic device 100 and/or on any other portion thereof depending on, for example, the energy requirements of the device, the anticipated use of the device, the functionality of the device, the number and type of solar powered mode(s) of the device, and/or the energy output of each solar cell. Persons skilled in the art will also appreciate that portable electronic device 100 can be any suitable device such as for example a portable media player (e.g., an iPod Shuffle™ available from Apple Inc., of Cupertino, Calif.), cellular telephone, internet-capable device, personal organizer, portable computing system, any other portable electronic device, or any combination thereof.

Figure 2:
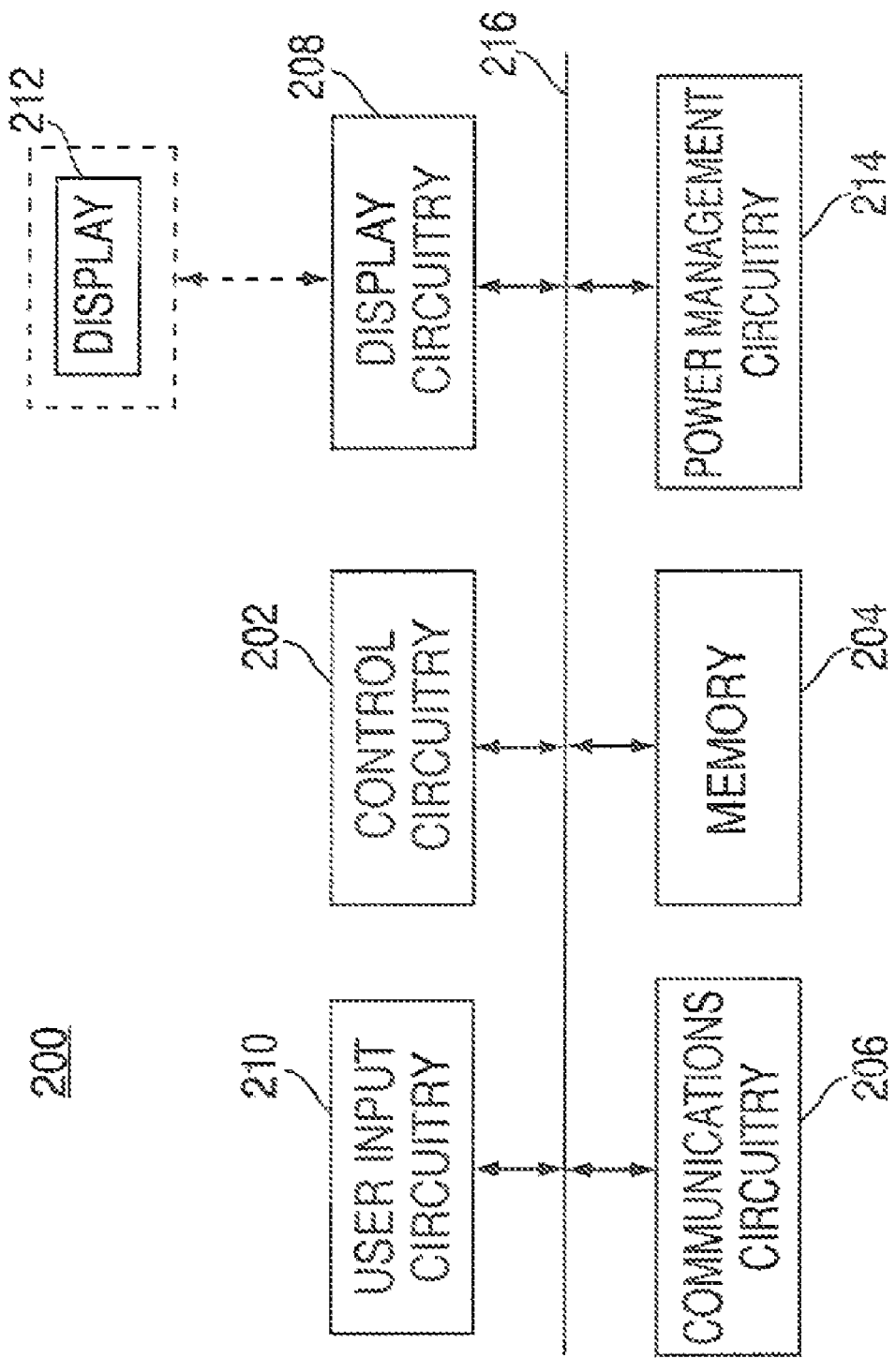
FIG. 2 shows a simplified block diagram of circuitry that can be implemented in a portable electronic device in accordance with some embodiments of the invention.

FIG. 2 shows a simplified block diagram of circuitry that can be incorporated into a portable electronic device 200, which is in accordance with some embodiments of the invention. Portable electronic device 200 can function the same as or similar to portable electronic device 100 of FIG. 1. Portable electronic device 200 can include control circuitry 202, memory 204, communications circuitry 206, display circuitry 208, user input circuitry 210, display 212, power management circuitry 214, and/or bus 216. In some embodiments, portable electronic device 200 can include more than one of each component or circuitry shown in FIG. 2, but for the sake of simplicity and to avoid overcomplicating the drawing, only one of each is shown in FIG. 2.

Control circuitry 202 can include, for example, circuitry that can be configured to perform any suitable function. Control circuitry 202 may be used to run operating system applications, media playback applications, media editing applications, and/or any other application.

Memory 204 can include one or more different types of memory or storage mediums which can be used to facilitate and/or perform device functions. For example, memory 204 can include a hard-drive, flash memory, permanent memory such as ROM, semi-permanent memory such as RAM, any other suitable type of storage component, or any combination thereof. Memory 204 can include cache memory, which may be one or more different types of memory used for temporarily storing data for electrical device applications. Memory 204 may store media data (e.g., music and video files), software (e.g., for implementing functions on device 200), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 200 to establish a wireless connection), subscription information (e.g., information that keeps track of podcasts or television shows or other media a user subscribes to), contacts information (e.g., telephone numbers and email addresses), calendar information, any other suitable data, or any combination thereof.

Communications circuitry 206 can permit device 200 to communicate with one or more servers or other electronic devices using any suitable communications protocol. For example, communications circuitry 206 may support Wi-Fi™ (e.g., a 802.11 protocol), Ethernet, Bluetooth™, high frequency systems (e.g., 900 MHz, 2.4 GHz, and 5.6 GHz communication systems), infrared, TCP/IP (e.g., any of the protocols used in each of the TCP/IP layers), HTTP, BitTorrent™, FTP, RTP, RTSP, SSH, any other communications protocol, or any combination thereof.

Display circuitry 208 can accept and/or generate signals for presenting media information (e.g., textual and/or graphic) on display 212. For example, display circuitry 208 can include a coder/decoder (CODEC) to convert digital media signals into analog signals. Display circuitry 208 also can include display driver circuitry and/or circuitry for driving display driver(s). The display signals can be generated by control circuitry 202 and/or display circuitry 208. In one embodiment, display 212 can be integrated with or externally coupled to portable electronic device 200.

Portable electronic device 200 also can be equipped with user input circuitry 210 that permits a user to interact or interface with portable electronic device 200 (e.g., user input component 104 of FIG. 1). For example, user input circuitry 210 can take a variety of forms, such as a button, electronic device pad, dial, click wheel, multi touch screen, touch pad, any other input component circuitry, or any combination thereof. User input circuitry 210 may emulate a rotary phone or a multi-button electronic device pad, which may be implemented on a touch screen.

Power management circuitry 214 can include solar cells (e.g., solar cells 106 and 108 of FIG. 1) that can be used to power device 200. In some embodiments, power management circuitry 214 can include additional circuitry for controlling and connecting the solar cells in different configurations. Power management circuitry 214 will be described in more detail in connection with FIG. 3.

Bus 216 can provide a data transfer path for transferring data to, from, or among control circuitry 202, memory 204, communications circuitry 206, display circuitry 208, user input circuitry 210, power management circuitry 214, and/or any other components of portable electronic device 200. For example, power management circuitry 214 can communicate to control circuitry 202, via bus 216, that the amount of available energy is low. As a result, control circuitry 202 can conserve energy by entering a energy conserving mode (e.g., dimming the display and/or shutting down certain lower priority applications). In addition, if portable electronic device 200 also includes communications circuitry 206 that is capable of supporting wireless communications and is enabled, control circuitry 202 can send a command to the communications circuitry to temporarily disable wireless communications. Control circuitry 202 can then wait for one or more control signals from power management circuitry 214, indicating that energy has been restored to normal levels. After receiving these signals, some or all of the device functions that were disabled to conserve power may be restored.

It will be appreciated that the functionality of certain components can be combined or omitted and that additional components, which are not shown in FIG. 2, can be included in portable electronic device 200.

Figure 3:
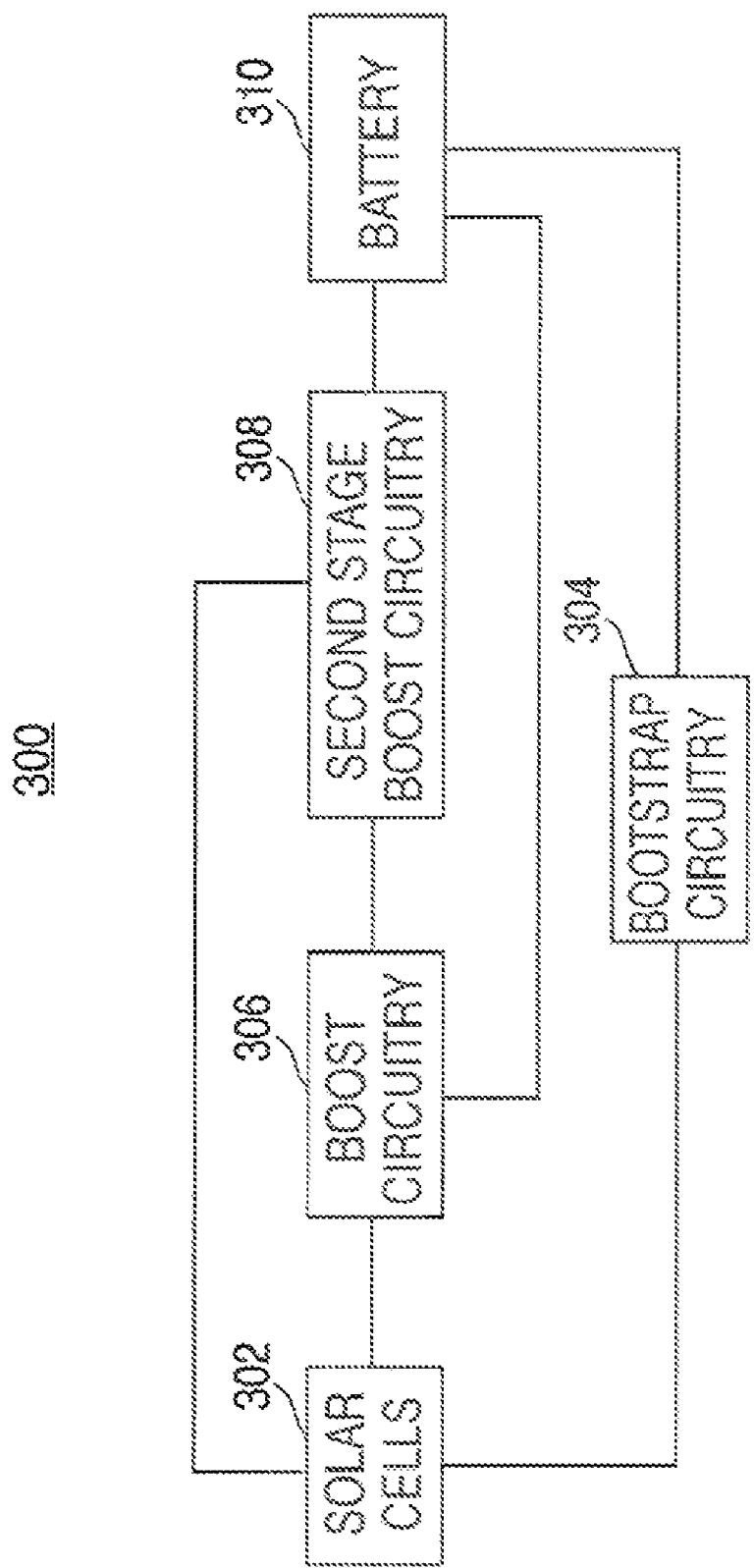
FIG. 3 shows a simplified block diagram of power management circuitry that can be implemented in a portable electronic device in accordance with some embodiments of the invention.

FIG. 3 shows a simplified block diagram of circuitry 300 that can comprise power management circuitry (e.g., power management circuitry 214) that can be implemented in a portable electronic device in accordance with some embodiments of the invention. Circuitry 300 can include solar cells 302, bootstrap circuitry 304, boost circuitry 306, second stage boost circuitry 308, and battery 310.

Although all of the components in circuitry 300 may be internal to a portable electronic device (e.g., portable electronic device 200 of FIG. 2), persons skilled in the art will appreciate that the various components can also be connected externally. For example, the portable electronic device can include bootstrap circuitry 304 and battery 310, but solar cells 302, boost circuitry 306, and second stage boost circuitry 308 may be external to the portable electronic device. For example, solar cells 302, boost circuitry 306, and second stage boost circuitry 308 can be integrated in a portable charger. Thus, an interconnect (e.g., a USB interface) can be used connect the portable electronic device to the solar cells and the boosting circuitries.

Battery 310 can power the portable electronic device if solar cells 302 are not activated. For example, the user may be using the portable electronic device indoors (e.g., in a dark room) or at night. Battery 310 may be any suitable type of standard rechargeable battery such as, for example, a nickel-cadmium, a lithium-ion, a nickel-metal hydride, or rechargeable alkaline battery.

Bootstrap circuitry 304 may be a programmable controller (e.g., an application-specific integrated circuit) that may be programmed to monitor various power levels in circuitry 300 and control other components in circuitry 300 (e.g., solar cells 302). For example, bootstrap circuitry 304 may monitor the charge on battery 310 and determine if battery 310 is drained. Bootstrap circuitry 304 may determine that the battery is drained, for example, if the battery is generating energy below a predetermined minimum threshold. As another example, bootstrap circuitry 304 may be capable of connecting solar cells 302 in a particular configuration.

Bootstrap circuitry 304 may be integrated on the portable electronic device in any suitable way. For example, bootstrap circuitry 304 may be included in control circuitry that controls other functions on the portable electronic device (e.g., control circuitry 202 of FIG. 2). In some cases, bootstrap circuitry 304 may also be kept separate from the control circuitry.

Bootstrap circuitry 304 can include a machine-readable storage medium that stores one or more machine instructions. For example, bootstrap circuitry 304 can be configured to execute one or more machine instructions for connecting solar cells 302 in a particular configuration depending on the state of battery 310.

Circuitry 300 may include solar cells 302 which can generate voltage for powering a portable electronic device (e.g., portable electronic device 200 of FIG. 2) when exposed to light. However, situations may arise when solar cells 302 are partially obstructed from direct light. For example, the user may be holding the portable electronic device in his hand, and a portion of solar cells 302 may be covered. As another example, the portable electronic device may be oriented such that not all of solar cells 302 are directly facing the light source. In such situations, bootstrap circuitry 304 can connect solar cells 302 in a configuration that allows the solar cells to generate a constant preset voltage as long as a subset of the solar cells is operating.

Figure 4:
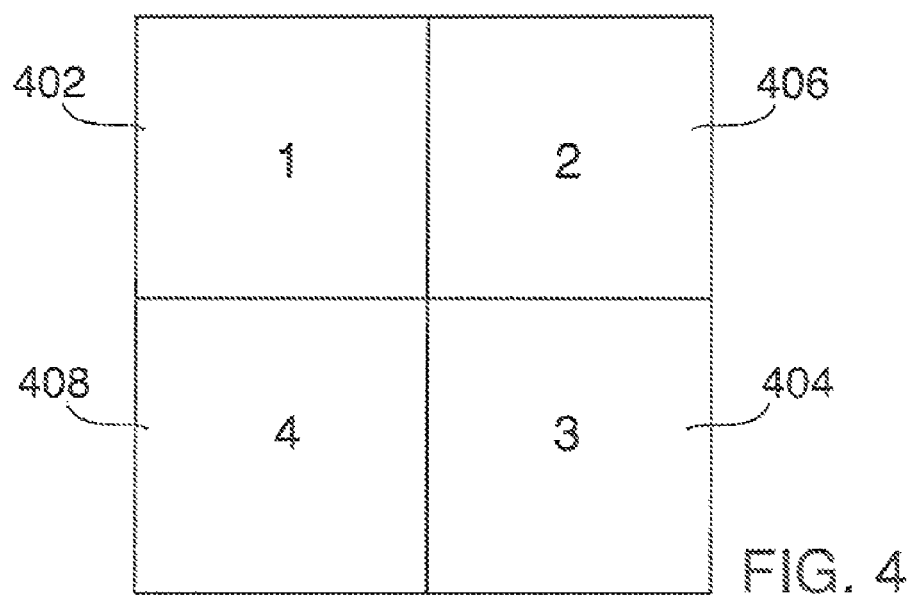
FIG. 4 shows an exemplary array of multiple solar cells in accordance with some embodiments of the invention.

FIG. 4 shows multiple solar cells in accordance with some embodiments of the invention. Four solar cells (e.g., solar cells 402, 404, 406, and 408) can be placed on a portable electronic device to power the device. In solar cell circuitry 500 of FIG. 5, solar cells 402 and 404 form first solar cell chain 502. In addition, solar cells 406 and 408 form second solar cell chain 504. It will be understood that although only four solar cells are shown, additional solar cells can be added to the system to form a multi-cell array.

In some cases, if one or more of the solar cells are obstructed from a light source, the voltage output of the solar cells will be diminished. In order to configure the solar cells to facilitate the generation of a constant preset voltage, bootstrap circuitry 304 can connect solar cells 402, 404, 406, and 408 such that the solar cells are electrically connected in a series/parallel configuration. In the series/parallel configuration, the solar cells can produce a constant preset voltage as long as a subset of the solar cells is operating. For example, a first subset of the solar cells (e.g., solar cells 402 and 404) can be connected in a parallel configuration to form a first parallel group. In addition, a second subset of the solar cells (e.g., solar cells 406 and 408) can be connected in a separate parallel configuration to form a second parallel group. Finally, the first parallel group and the second parallel group can be connected in series to form the series/parallel configuration.

Figure 5:
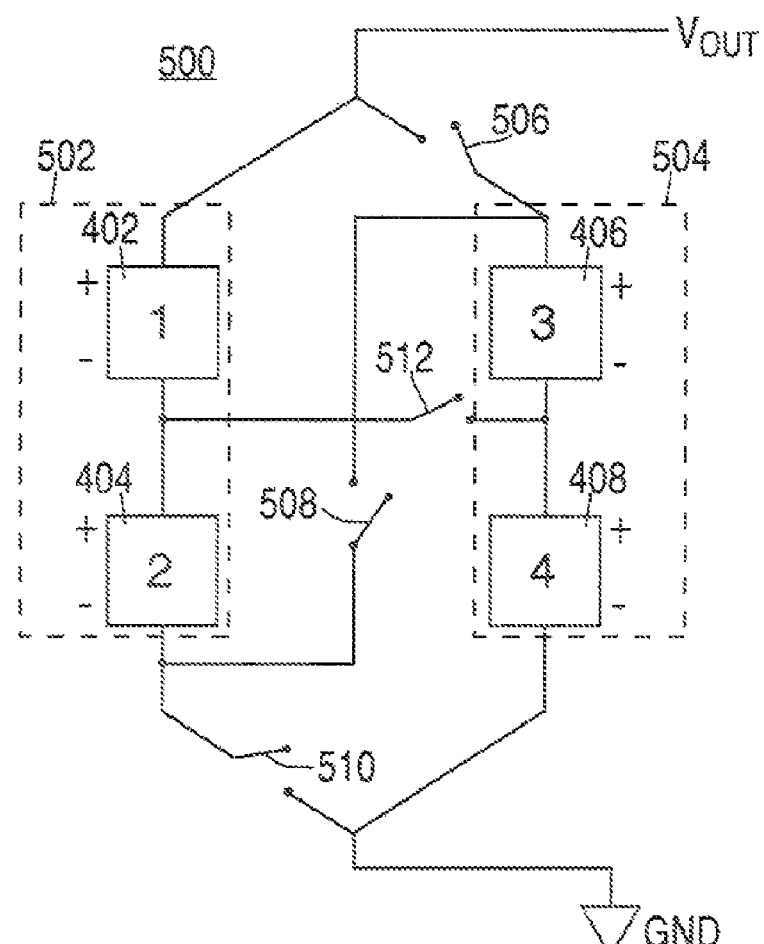
FIG. 5 shows a schematic block diagram of solar cell circuitry in accordance with some embodiments of the invention.

In some embodiments, switches (e.g., switches 506, 508, 510, and 512) can be placed between solar cells, a power plane (e.g., $V_{OUT}$), and/or a ground plane. For example, as shown in FIG. 5, switch 506 is placed between solar cell 406 and $V_{OUT}$. In addition, switch 508 is placed between solar cell 404 and solar cell 406, and switch 510 is placed between solar cell 404 and ground. Finally, switch 512 is placed between a first node intermediate solar cells 402 and 404 and a second node intermediate solar cells 406 and 408. Thus, the bootstrap circuitry can connect the solar cells in a series/parallel configuration by closing switches 506, 510, and 512 and opening switch 508.

In such a configuration, a pair of solar cells can generate a voltage to power the portable electronic device. For example, if two horizontally paired solar cells such as solar cells 402 and 406 are obstructed, solar cells 404 and 408 may generate the voltage. Similarly, if solar cells 404 and 408 are obstructed, solar cells 402 and 406 may generate the voltage. As another example, if two vertically paired solar cells such as solar cells 402 and 408 are obstructed, solar cells 404 and 406 may generate the voltage. Similarly, if solar cells 404 and 406 are obstructed, solar cells 402 and 408 may generate the voltage. If each solar cell generates 0.5 V, then a pair of solar cells may be capable of producing 1.0 V (two solar cells in series) in the series/parallel configuration.

In some embodiments, the circuitry can actively monitor for reduced voltage output from the solar cells and automatically connect the solar cells such that a constant preset voltage can continue to be generated (e.g., in a series/parallel configuration). Thus, in the event that there is a partial obstruction of the solar cells, the solar cells can be reconnected around the partial obstruction. For example, multiple solar cells (e.g., a multi-cell array) can be placed on a portable computing system (e.g., laptop). When a user is carrying the portable computing system in one arm, any portion of the multiple solar cells may be obstructed. The circuitry can detect this obstruction by monitoring for a reduced voltage output from the solar cells. In response to detecting a reduced voltage output, the circuitry can re-route the rest of the solar cells around the obstruction. For example, a matrix of switches can open or close in order to re-route the rest of the solar cells around the obstruction. Thus, in a new configuration, the subset of the solar cells that are not partially obstructed can continue to generate a constant preset voltage to power the portable electronic device.

In some embodiments, the constant preset voltage generated by the subset of solar cells may be less than the amount needed to power the portable electronic device. Thus, in some cases, circuitry 300 can also include boost circuitry 306 which can determine that the power generated by the solar cells is insufficient to power one or more components of the portable electronic device.

In response to determining that the power generated by the solar cells is insufficient, boost circuitry 306 can regulate the power generated by the solar cells (e.g., boost the constant preset voltage to a higher boost voltage). Boost circuitry 306 can, for example, use voltage sensing or output current sensing to boost the power generated by the solar cells. The power generated by boost circuitry 306 can then directly be used to power the portable electronic device and/or any of its individual components (e.g., boost the constant preset voltage from 1.0 V to 5.0 V). In some cases, boost circuitry 306 may be capable of boosting the constant preset voltage to a slightly higher value (e.g., from 1.0 V to 2.0 V). A more detailed discussion of using boosting to regulate the power generated by solar cells may be found in, for example, Sander et al., U.S. published patent application No. 2008/0084117, filed Oct. 6, 2006, entitled "Methods and Apparatuses for Operating Devices with Solar Power," and Sander et al., U.S. published patent application No. 2008/0084177, filed Oct. 6, 2006, entitled "Portable Devices Having Multiple Power Interfaces," each of which is incorporated by reference herein in its entirety.

Any suitable circuitry may be used to implement boost circuitry 306. For example, boost circuitry 306 may be a charge pump that uses capacitors to boost the voltage. The capacitors can store energy provided by a battery (e.g., battery 310). Energy that is stored can then be used to boost the voltage generated by the solar cells.

Additionally, if the power generated by boost circuitry 306 is still not sufficient to power the portable electronic device, circuitry 300 can also include optional second stage boost circuitry 308. Second stage boost circuitry 308 can provide an additional boost to the voltage generated by boost circuitry 306. Second stage boost circuitry 308 can include any suitable circuitry that does not need to be powered by a battery such as, for example, an inductor-based boost converter. Second stage boost circuitry 308 can be capable of generating a large range of output voltages from an input voltage that is above a certain threshold (e.g., 2.0 V). For example, when provided with an input voltage of 2.0 V, second stage boost circuitry 308 can boost the input voltage to 5.0 V. In some cases, second stage boost circuitry 308 can boost the input voltage to values greater than 5.0 V.

Any surplus energy provided by boost circuitry 306 and/or second stage boost circuitry 308 can be used to charge battery 310 if battery 310 is not fully charged. Battery 310 may be considered not fully charged if it is generating energy at or below an operating threshold, which can be higher than or the same as the predetermined minimum threshold.

In order to power boost circuitry 306, battery 310 may need to be partially charged. Thus, when battery 310 is drained, the voltage generated by solar cells 302 in the series/parallel configuration may no longer be sufficient to power the portable electronic device. Thus, in response to determining that battery 310 is drained, solar cells 302 can be connected in a different configuration to facilitate the generation of a startup voltage which can power the portable electronic device. For example, solar cells 302 can be connected in a series configuration.

In order to connect the solar cells in a series configuration, switches 506, 510, and 512 of FIG. 5 may operate in an open state and switch 508 of FIG. 5 may operate in a closed state. In some embodiments, bootstrap circuitry 304 can connect the switches in the series configuration. In some embodiments, switches 506, 508, 510, and 512 can be selected such that their normal operating states can automatically connect the solar cells in the series configuration. Such embodiments can be useful when bootstrap circuitry 304 is not functioning. For example, if bootstrap circuitry 304 obtains its power from battery 310, bootstrap circuitry 304 may be unable to control the switches when battery 310 is drained.

In some embodiments, switches 506, 508, 510, and 512 can be relays. Each relay is either normally open or normally closed in the inactive state. Thus, when the switches are operating in their normal operating states (e.g., switches 506, 510, and 512 are open and switch 508 is closed), the solar cells can be automatically connected in the series configuration.

In some embodiments, switches 506, 508, 510, and 512 can be field-effect transistors. For example, switch 506 can be an enhancement-mode p-type field effect transistor (PFET), which can be in a normally open state. As another example, switch 508 can be a depletion mode field-effect transistor (FET), which can be in a normally closed state. As yet another example, switch 510 can be an enhancement mode n-type field effect transistor (NFET), which can be in a normally open state. As a further example, switch 512 can be an enhancement mode FET, which can be in a normally open state. Persons skilled in the art will appreciate that any suitable types of devices which can operate properly in their normal states can be used for switches 506, 508, 510, and 512.

The states of switches 506, 508, 510, and 512 in both the series/parallel configuration and the series configuration are summarized in the following table:

| Switch/State | Series | Series/Parallel |
|---|---|---|
| 506 | Open | Closed |
| 508 | Closed | Open |
| 510 | Open | Closed |
| 512 | Open | Closed |

Once the solar cells are connected in a series configuration, which may maximize the overall voltage generated by the solar cells, a startup voltage can be generated that powers the portable electronic device. For example, if each solar cell is capable of producing a voltage of 0.5 V, then the series combination of the four solar cells can produce a combined voltage of 2.0 V. In some embodiments, the startup voltage can be sufficient to directly power the portable electronic device.

In addition, when the solar cells are connected in the series configuration, the solar cells can be used to directly power boost circuitry 306. As a result, boost circuitry 306 can continue to regulate the power generated by the solar cells even when battery 310 is drained. In some cases, if the energy demands of the portable electronic device are greater, the startup voltage can also be boosted by second stage boost circuitry 308. The boosted voltage can then be used to power the portable electronic device.

After the portable electronic device has been powered by the startup voltage, any surplus energy (e.g., energy that exceeds the load of the portable electronic device) may be used to charge drained battery 310. The surplus energy can be generated by solar cells 302 and boost circuitry (e.g., boost circuitry 306 and/or second stage boost circuitry 308). After battery 310 has been charged to a value suitable for powering boost circuitry 306, bootstrap circuitry 304 may then switch solar cells 302 to a series/parallel configuration. In some cases, the value that battery 310 is charged to may exceed an operating threshold, which can be higher than or the same as the predetermined minimum threshold.

Once solar cells 302 have been connected in a series/parallel configuration, solar cells 302 can power the portable electronic device even when they are partially obstructed. Furthermore, since battery 310 has been charged to a suitable value, it can provide energy to power boost circuitry 306. As a result, although solar cells 302 may be generating less power in a series/parallel configuration than in a series configuration, boost circuitry 306 can regulate the power. The regulated power can then be fed to second stage boost circuitry 308.

Although circuitry 300 is shown with second stage boost circuitry 308, it will be understood that, in some cases, the solar cells may generate enough voltage in both the series and the series/parallel configurations to power the portable electronic device and charge battery 310 without second stage boost circuitry 308. In such cases, boost circuitry 306 can be powered by battery 310, the solar cells, or any combination thereof. Furthermore, although the previous discussion has been directed to solar cells on portable electronic devices, such a configuration can also be applied to other solar powered systems such as solar panel roofs used to power homes.

Figure 6A:
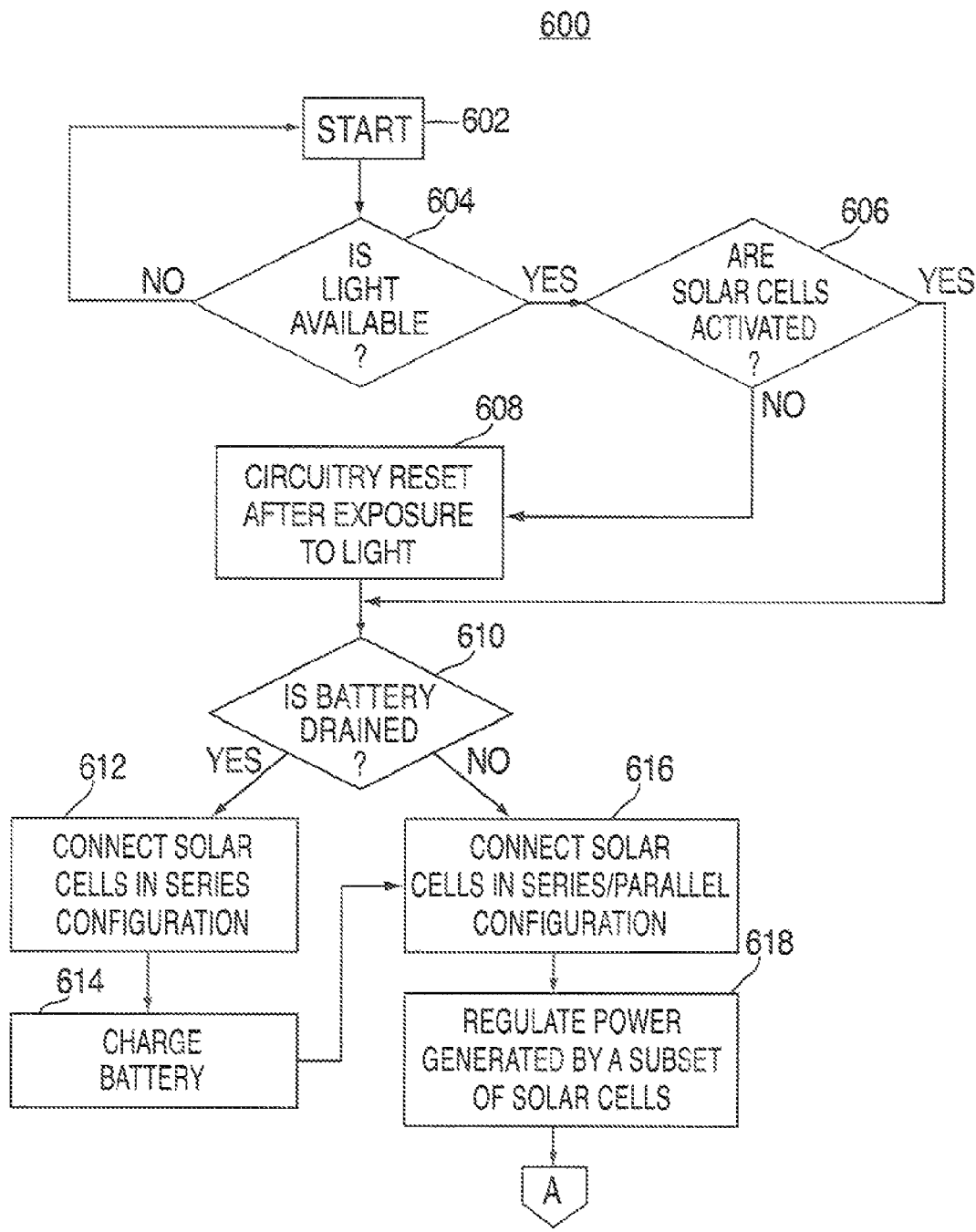
FIGS. 6A and 6B show a flowchart of an exemplary process for powering a portable electronic device using solar cells in accordance with some embodiments of the invention.
Figure 6B:
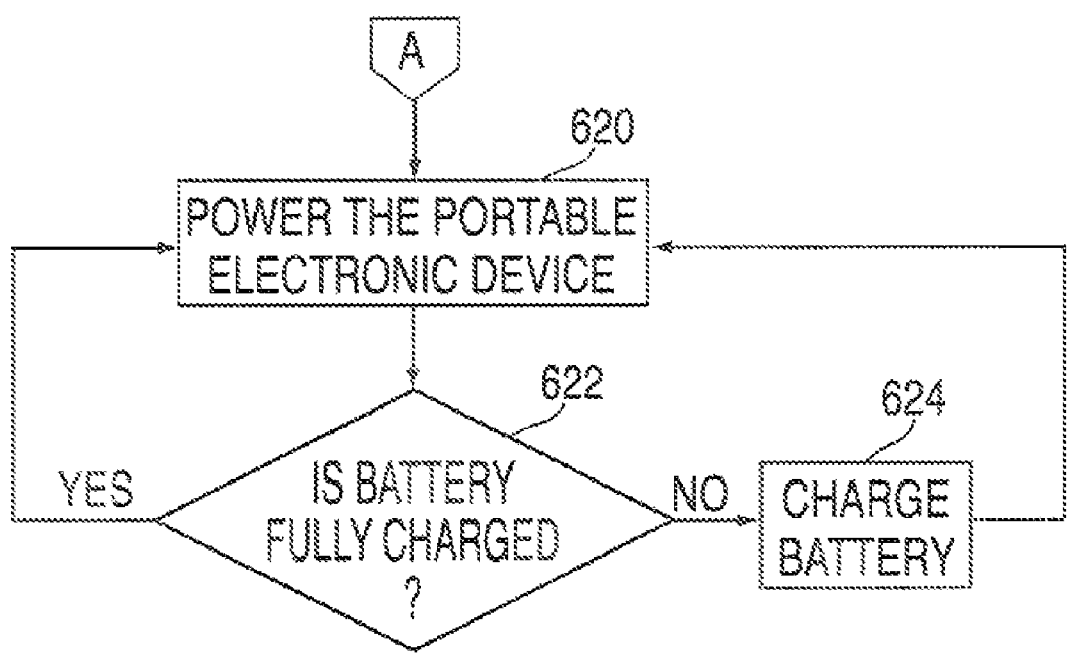

FIGS. 6A and 6B show a flowchart of an exemplary process for powering a portable electronic device using solar cells in accordance with some embodiments of the invention. Process 600 starts at step 602. At step 604, the portable electronic device can determine whether light is available.

If, at step 604, the portable electronic device determines that light is not available, process 600 may move back to step 602. For example, the portable electronic device may currently be in the user's pocket or in a dark room. At step 602, the portable electronic device can continue to wait until light is available.

If, at step 604, the portable electronic device instead determines that light is available, process 600 may move to step 606. At step 606, the portable electronic device can determine whether the solar cells are activated. For example, the portable electronic device can determine that the solar cells are activated when one or more solar cells (e.g., solar cells 302 of FIG. 3) of the portable electronic device are currently converting light energy into electric energy. If, at step 606, the portable electronic device determines that the solar cells are not activated, process 600 may move to step 608.

At step 608, circuitry (e.g., control circuitry 202 of FIG. 2, solar cells 302 of FIG. 3, bootstrap circuitry 304 of FIG. 3, power management circuitry 300 of FIG. 3, and/or any other circuitry) can reset once the solar cells are exposed to light. For example, the user may have taken the portable electronic device outside or turned the lights on in a previously dark room. After the circuitry has reset, process 600 may move to step 610.

At step 610, the circuitry can determine whether a battery (e.g., battery 310 of FIG. 3) on the portable electronic device is drained (e.g., the battery is generating energy below a predetermined minimum threshold). Step 610 can also occur in response to the portable electronic device determining at step 606 that the solar cells are activated. If, at step 610, the circuitry determines that the battery is drained, process 600 may move to step 612. In some embodiments, when the circuitry is not operating because the battery is drained, process 600 may be configured to automatically proceed to step 612.

At step 612, the solar cells can be connected in a series configuration to generate a startup voltage (e.g., 2.0 volts). For example, in order to operate in a condition where the battery is drained (e.g., no input power), switches in the solar cells can be selected such that their normal operating states automatically connect the solar cells in the series configuration. In some embodiments, while the solar cells are connected in the series configuration, the solar cells can be used to directly power boost circuitry (e.g., boost circuitry 306 of FIG. 3). As a result, the boost circuitry can continue to regulate the power generated by the solar cells even when the battery is drained. After the solar cells have been connected in a series configuration, process 600 may move to step 614.

At step 614, the drained battery can be charged using any surplus energy left after generating the startup voltage. After the battery has been charged to a value suitable for powering the boost circuitry (e.g., boost circuitry 306), process 600 may move to step 616.

At step 616, the circuitry can connect the solar cells in a series/parallel configuration. For example, the solar cells can be connected such that the solar cells can produce a constant preset voltage (e.g., 1.0 V) as long as a subset of the solar cells is operating. Step 616 can also occur in response to the circuitry determining at step 610 that the battery is not drained. After the solar cells have been connected in a series/parallel configuration, process 600 may move to step 618.

At step 618, boost circuitry (e.g., boost circuitry 306 of FIG. 3) can regulate the power generated by a subset of the solar cells (e.g., boost the constant preset voltage to a higher value). For example, the boost circuitry can boost the 1.0 V output generated by the solar cells to 5.0 V, which can be used to power the portable electronic device. As another example, the boost circuitry can boost the 1.0 V output generated by the solar cells to 2.0 V, which can then be fed to a second stage boost circuitry (e.g., second stage boost circuitry 308 of FIG. 3). After the boost circuitry has regulated the power generated by a subset of the solar cells, process 600 may move to step 620.

At step 620, the power generated by the boost circuitry can be used to power the portable electronic device. After powering the portable electronic device, process 600 can move to step 622.

At step 622, the circuitry can determine if the battery is fully charged. In response to the circuitry determining at step 622 that the battery is fully charged, process 600 may move back to step 620. At step 620, the portable electronic device can continue to be powered.

In response to the circuitry instead determining at step 622 that the battery is not fully charged, process 600 may move to step 624. At step 624, any surplus energy left from powering the portable electronic device (e.g., surplus energy generated by the solar cells, boost circuitry 306, and/or second stage boost circuitry 308) can be used to charge the battery. After the battery has been charged, process 600 may move back to step 620, discussed previously.

It will be understood that the foregoing is only illustrative of the principles of the invention, and that the invention can be practiced by other than the described embodiments, which are presented for purposes of illustration and not of limitation, and the invention is limited only by the claims which follow.

What is claimed is:

1. A method of powering a portable electronic device using a plurality of solar cells, comprising:
   determining that a battery of the portable electronic device is drained; and
   in response to determining the battery is drained, switching the plurality of solar cells to a first operational state that facilitates the generation of a startup voltage to power the portable electronic device, wherein the switching comprises connecting the plurality of solar cells in a series configuration.

2. The method of claim 1,
wherein the plurality of solar cells generate the startup voltage.

3. The method of claim 2, further comprising:
charging the battery using a surplus energy;
determining that the battery is charged; and
in response to determining that the battery is charged, switching the plurality of solar cells to a second operational state that facilitates the generation of a constant preset voltage as long as a subset of the plurality of solar cells is operating.

4. The method of claim 3, wherein the switching the plurality of solar cells to the second operational state comprises:
connecting the plurality of solar cells in a series/parallel configuration.

5. The method of claim 4, further comprising:
determining that the constant preset voltage is insufficient to power at least one component of the portable electronic device; and
in response to determining the constant preset voltage is insufficient, boosting the constant preset voltage to a boost voltage using battery power from the battery of the portable electronic device.

6. A method of powering a portable electronic device using a plurality of solar cells, comprising:
determining that a battery of the portable electronic device is not drained; and
in response to determining the battery is not drained, switching the plurality of solar cells to an operational state that facilitates the generation of a constant preset voltage as long as a subset of the plurality of solar cells is operating, wherein the switching comprises connecting the plurality of solar cells in a series/parallel configuration.

7. The method of claim 6, further comprising:
determining that the constant preset voltage is insufficient to power at least one component of the portable electronic device; and
in response to determining the constant preset voltage is insufficient, boosting the constant preset voltage to a boost voltage using battery power from the battery of the portable electronic device.

8. The method of claim 7, further comprising:
determining that the battery is not fully charged; and
charging the battery using a surplus energy.

9. A portable electronic device comprising:
a battery;
a plurality of solar cells; and
bootstrap circuitry for:
determining that the battery is drained; and
in response to determining the battery is drained, switching the plurality of solar cells to a first operational state that facilitates the generation of a startup voltage to power the portable electronic device.

10. The portable electronic device of claim 9, wherein the bootstrap circuitry is operative to:
determine that the battery is not drained; and
in response to determining the battery is not drained, switching the plurality of solar cells to a second operational state that facilitates the generation of a constant preset voltage as long as a subset of the plurality of solar cells is operating.

11. The portable electronic device of claim 9, wherein the plurality of solar cells comprises:
a first solar cell chain, wherein the first solar cell chain comprises first and second solar cells, and a first node intermediate the first and the second solar cells; and
a second solar cell chain, wherein the second solar cell chain comprises third and fourth solar cells, and a second node intermediate the third and the fourth solar cells.

12. The portable electronic device of claim 11, wherein the plurality of solar cells further comprises:
a first switch between the third solar cell and a power plane.

13. The portable electronic device of claim 12, further comprising:
a second switch between the second and the third solar cells.

14. The portable electronic device of claim 13, further comprising:
a third switch between the second solar cell and a ground plane.

15. The portable electronic device of claim 14, further comprising;
a fourth switch between the first and second nodes.

16. The portable electronic device of claim 15, wherein the first, second, third, and fourth switches are relays.

17. The portable electronic device of claim 15, wherein the bootstrap circuitry is operative to open the first, third, and fourth switches and to close the second switch while switching to the first operational state.

18. The portable electronic device of claim 15, wherein each of the first, third, and fourth switches is open in a normal operating state and the second switch is closed in a normal operating state.

19. The portable electronic device of claim 18, wherein the bootstrap circuitry is operative to:
determine that the battery is not drained; and
in response to determining the battery is not drained, switching the plurality of solar cells to a second operational state that facilitates the generation of a constant preset voltage as long as a subset of the plurality of solar cells is operating, wherein the bootstrap circuitry is operative to close the first, third, and fourth switches and open the second switch while switching to the second operational state.

20. The portable electronic device of claim 18, wherein the bootstrap circuitry is operative to:
determine that the battery is not drained;
in response to determining the battery is not drained, switching the plurality of solar cells to a second operational state that facilitates the generation of a constant preset voltage as long as a subset of the plurality of solar cells is operating, and further comprising:
boost circuitry for:
determining that the constant preset voltage is insufficient to power at least one component of the portable electronic device; and
in response to determining the constant preset voltage is insufficient, boosting the constant preset voltage to a boost voltage using battery power from the battery.

21. An apparatus for powering a portable electronic device, comprising:
a battery;
a plurality of solar cells;
a plurality of switches, wherein at least one switch of the plurality of switches is connected between a pair of solar cells of the plurality of solar cells; and
circuitry that:
monitors a charge of the battery;
detects a reduced voltage output of the plurality of solar cells; and
controls the plurality of switches.

22. The apparatus of claim 21, wherein the plurality of switches are relays.

23. The apparatus of claim 21, wherein the circuitry is operative to configure the plurality of switches such that a subset of the plurality of solar cells are connected in a series/parallel configuration in response to detecting the reduced voltage output of the plurality of solar cells.

24. The apparatus of claim 21, wherein the circuitry is operative to configure the plurality of switches such that the plurality of solar cells are connected in a series configuration in response to monitoring that the charge of the battery is below a predetermined minimum threshold.

25. The apparatus of claim 21, wherein the plurality of switches automatically connects the plurality of solar cells in a series configuration when each of the plurality of switches is operating in a normal operating state.

* * * * *